United States Patent
Russ et al.

(10) Patent No.: US 8,777,587 B2
(45) Date of Patent: Jul. 15, 2014

(54) FLUID TRANSFER TUBE FOR SEVERE MISALIGNMENT APPLICATIONS

(75) Inventors: David Everett Russ, Rockford, IL (US); Magdy A. Kandil, Rockford, IL (US); Doren C. Smith, Rockford, IL (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 57 days.

(21) Appl. No.: 13/462,417

(22) Filed: May 2, 2012

(65) Prior Publication Data
US 2013/0292510 A1 Nov. 7, 2013

(51) Int. Cl.
  *F04B 17/02* (2006.01)
  *F04D 29/60* (2006.01)
(52) U.S. Cl.
  USPC .............. 417/229; 417/423.15; 416/143
(58) Field of Classification Search
  USPC .............. 417/423.15, 229; 403/34, 37–39, 403/161–165; 416/143, 142
  See application file for complete search history.

(56) References Cited

U.S. PATENT DOCUMENTS

| | | | |
|---|---|---|---|
| 4,742,976 A | 5/1988 | Cohen | |
| 5,354,182 A * | 10/1994 | Niemiec et al. | 417/363 |
| 5,820,074 A * | 10/1998 | Trommer et al. | 244/58 |
| 6,217,030 B1 * | 4/2001 | Zitting | 277/435 |
| 6,331,099 B1 | 12/2001 | Eccles et al. | |
| 6,769,867 B2 | 8/2004 | Uematsu et al. | |
| 7,416,392 B2 | 8/2008 | Russ | |
| 2008/0083227 A1 | 4/2008 | Eleftheriou et al. | |
| 2010/0158601 A1 * | 6/2010 | Salas Madrid et al. | 403/38 |
| 2011/0236218 A1 | 9/2011 | Russ et al. | |

* cited by examiner

Primary Examiner — Bryan Lettman
(74) Attorney, Agent, or Firm — Kinney & Lange, P.A.

(57) ABSTRACT

A hydraulic system for a ram air turbine includes a hydraulic pump having a high pressure fluid outlet port, a housing, a pivot post arranged to pass through the housing and defining a mechanical pivot relative to the housing about an axis, a transfer tube positioned between the high pressure fluid outlet port of the hydraulic pump and a port in the housing for the high pressure fluid outlet path, and seal elements positioned at or near opposite ends of the transfer tube. A fluid inlet path and a high pressure fluid outlet path pass through the housing and the pivot post. The transfer tube has a crowned end.

19 Claims, 6 Drawing Sheets

FLUID TRANSFER TUBE FOR SEVERE MISALIGNMENT APPLICATIONS

BACKGROUND

The present invention relates to fluid conduit assemblies, and more particularly to hydraulic conduit assemblies for use with ram air turbines (RATs).

Modern aircraft often include a secondary or emergency power system that can provide power in the event that power is unavailable from a primary power system. RATs are commonly used for secondary or emergency power systems to provide electrical and/or hydraulic power. A typical RAT is deployable in flight by opening suitable doors or hatches in the aircraft's fuselage. The RAT presents a rotatable turbine to oncoming airflow, which rotates the turbine. Rotational energy (torque) from the turbine is then transmitted to a suitable power conversion device (e.g., generator, pump, etc.) that converts that rotational energy to a desired form for use by the aircraft. For RAT installations that include a hydraulic pump for moving hydraulic fluid, suitable fluidic conduits must be provided to deliver the hydraulic fluid to and from the pump.

RATs that include a hydraulic pump located on a deployable RAT module must be configured in such as way as to allow hydraulic fluid transmission from the RAT module to other desired locations while still permitting actuation of the RAT module between stowed and deployed positions. Such fluid transmission has been accomplished in the past using flexible hoses or a pivot tube assembly.

Prior art aircraft components have included transfer tubes for low pressure installations at internal locations, for providing a fluid conduit between two components that accept fluid. Some prior art low pressure transfer tubes 6, shown in FIG. 4, have had ends of unequal diameters having cylindrical ends with grooves for sealing o-rings. Other prior art low pressure transfer tubes 8, shown in FIG. 5, have included crowned (i.e., curved) ends without sealing rings or gaskets. These prior art transfer tubes have been used in internal locations where some fluid leakage may be acceptable. However, these prior art transfer tubes were not configured to handle high pressure applications, and permitted only a relatively low degree of misalignment between the components they connect, that is, between the connection interfaces at opposite ends of the transfer tubes. FIG. 6 shows a prior art RAT with external high and low pressure transfer tubes 9 with cylindrical ends having seals and a pressure bolt 9-1 passing through a spacer tube 9-2 that is shimmed using shims 9-3. In cross-section, the transfer tubes 9 generally resemble longer versions of the transfer tube 6 shown in FIG. 4.

SUMMARY

A hydraulic system for a ram air turbine according to the present invention includes a hydraulic pump having a high pressure fluid outlet port, a housing, a pivot post arranged to pass through the housing and defining a mechanical pivot relative to the housing about an axis, a transfer tube positioned between the high pressure fluid outlet port of the hydraulic pump and a port in the housing for the high pressure fluid outlet path, and seal elements positioned at or near opposite ends of the transfer tube. A fluid inlet path and a high pressure fluid outlet path pass through the housing and the pivot post. The transfer tube has a crowned end.

Figure 1:
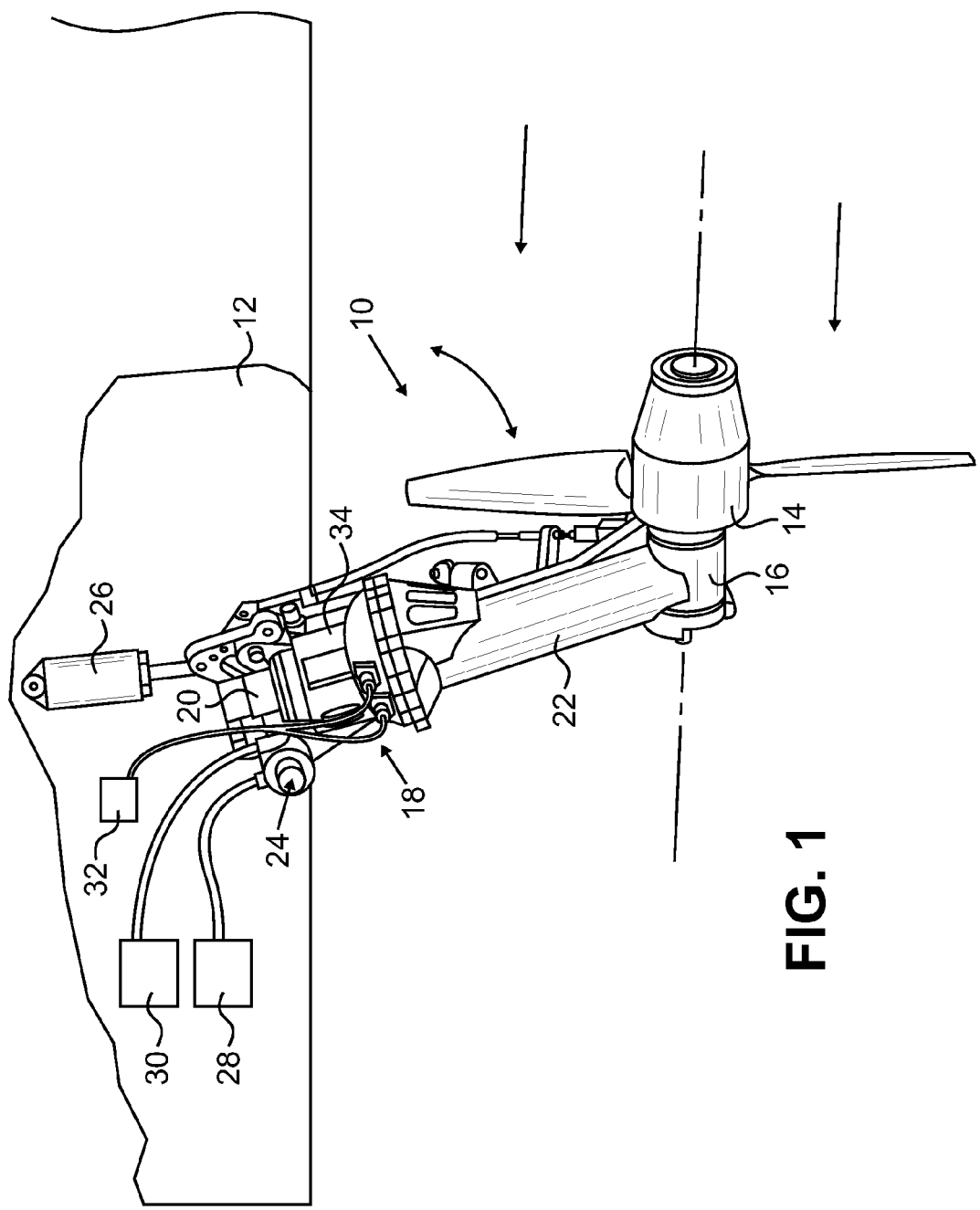
FIG. 1 is a perspective view of an embodiment of a ram air turbine (RAT).

While the above-identified drawing figures set forth at least one embodiment of the invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

FIG. 1 is a perspective view of an embodiment of a ram air turbine (RAT) module assembly 10 that is mounted to an airframe 12 and is deployable between a stowed position for storage when not in use and a deployed position to provide electric power and hydraulic pressure. The RAT module assembly 10 can be similar to that disclosed in U.S. Patent Application Publication No. 2011/0236218. FIG. 1 illustrates the RAT module assembly 10 in a deployed position. The RAT 10 includes a turbine 14, a gearbox 16, a generator 18, a hydraulic pump 20, a strut 22, a pivot post (or swivel post) 24, an actuator 26, a fluid supply location 28, a fluid delivery location 30, an electricity delivery location 32, and a generator housing 34 (also simply called a "housing"). Other components not specifically identified can also be included with the RAT assembly 10.

The turbine 14 is supported at the end of strut 22, which in turn is attached to the generator housing 34. The generator housing 42 is mounted to the airframe 12 with the swivel post 24, which allows pivotal movement of the turbine 14, strut 22, generator housing 34, etc. relative to the airframe 12 and further provides fluid paths between the hydraulic pump 20 and both the fluid supply location 28 and the fluid delivery location 30. The generator 18 is disposed within the generator housing 34, and the hydraulic pump is supported on the generator housing 34. The generator 18 can generate electric power that can be supplied to the electricity delivery location 32. The hydraulic pump 20 can receive fluid (e.g. hydraulic fluid) from the fluid supply 28 and can pump the fluid to various systems at the delivery location 30 that utilize pressurized fluid for operation.

During flight, the turbine 14 can rotate responsive to air flow along the outside of the airframe 12. Rotational power from the turbine 14 can be transmitted through the gearbox 16 to both the generator 18 and the hydraulic pump 20 for operation. The hydraulic pump 20 can be coupled to the generator 18 such that the hydraulic pump 20 rotates at the same speed as the generator 18. In alterative embodiments, the hydraulic pump 20 and the generator can be rotated at different speeds.

The RAT 10 illustrated in FIG. 1 is shown merely by way of example and not limitation. Those of ordinary skill in the art will recognize that other RAT configurations are possible.

Figure 2:
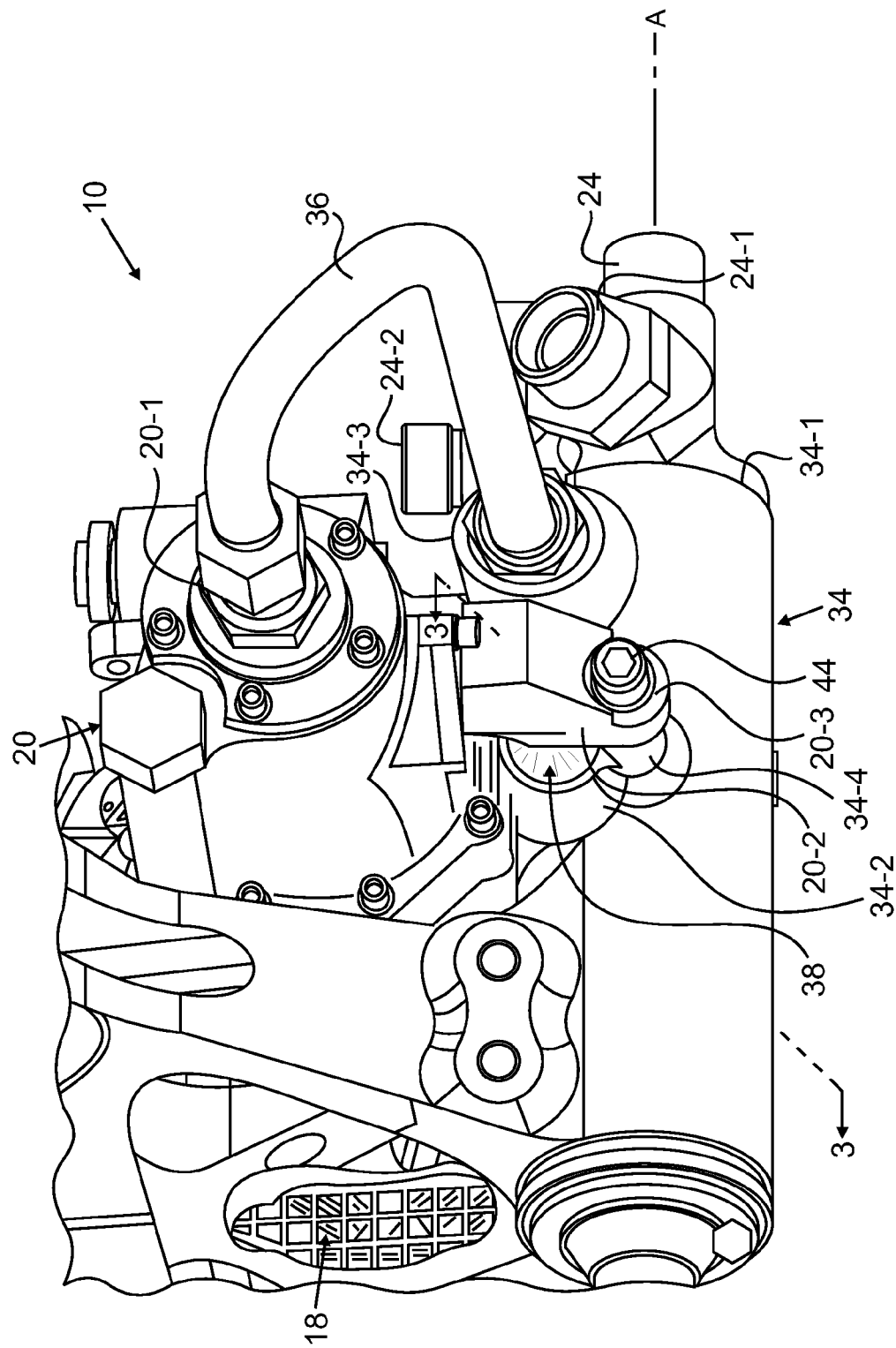
FIG. 2 is a perspective view of a portion of the RAT, illustrating a transfer tube assembly according to the present invention.
Figure 3:
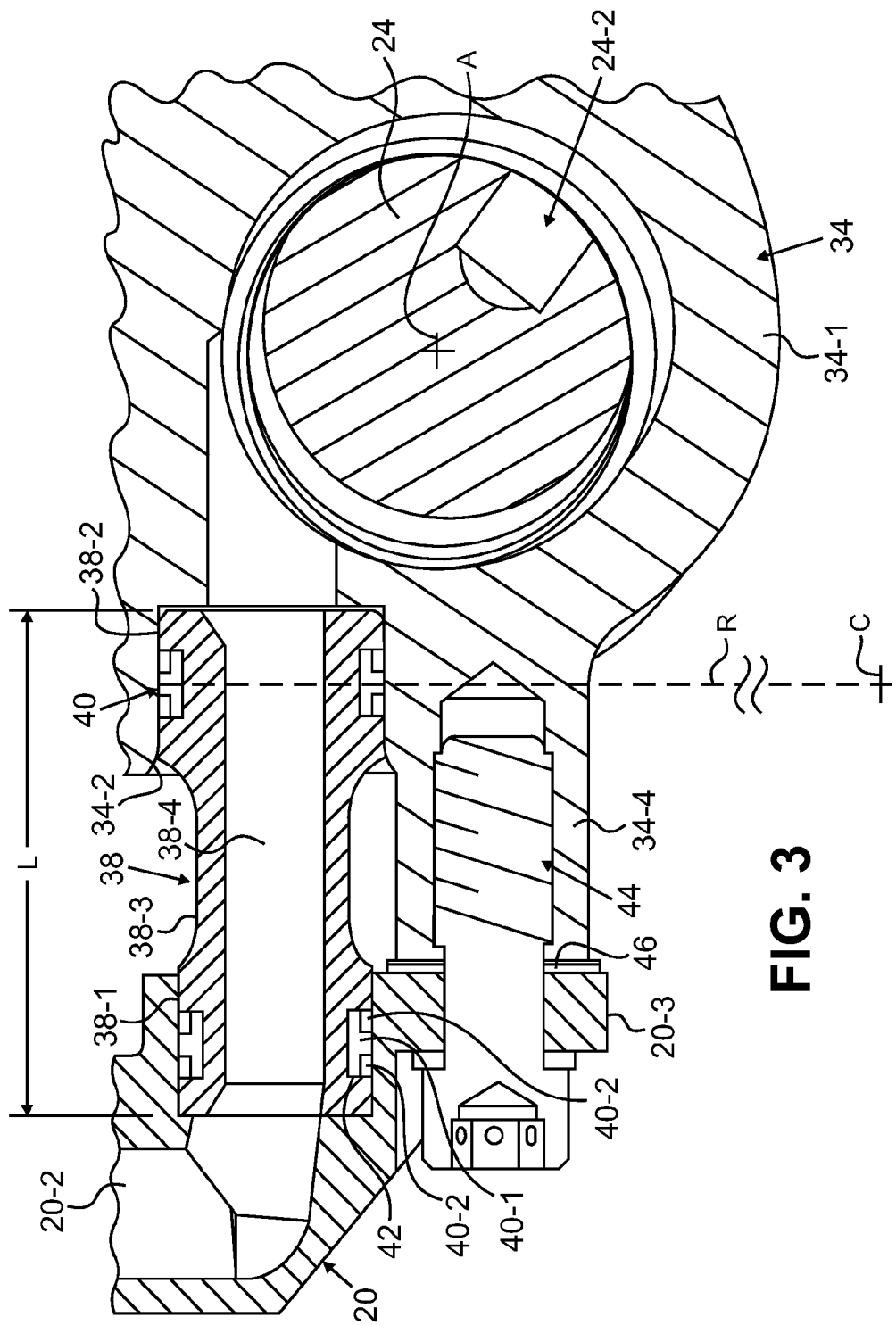
FIG. 3 is a cross-sectional view of the transfer tube assembly, taken along line 3-3 of FIG. 2.
Figure 4:
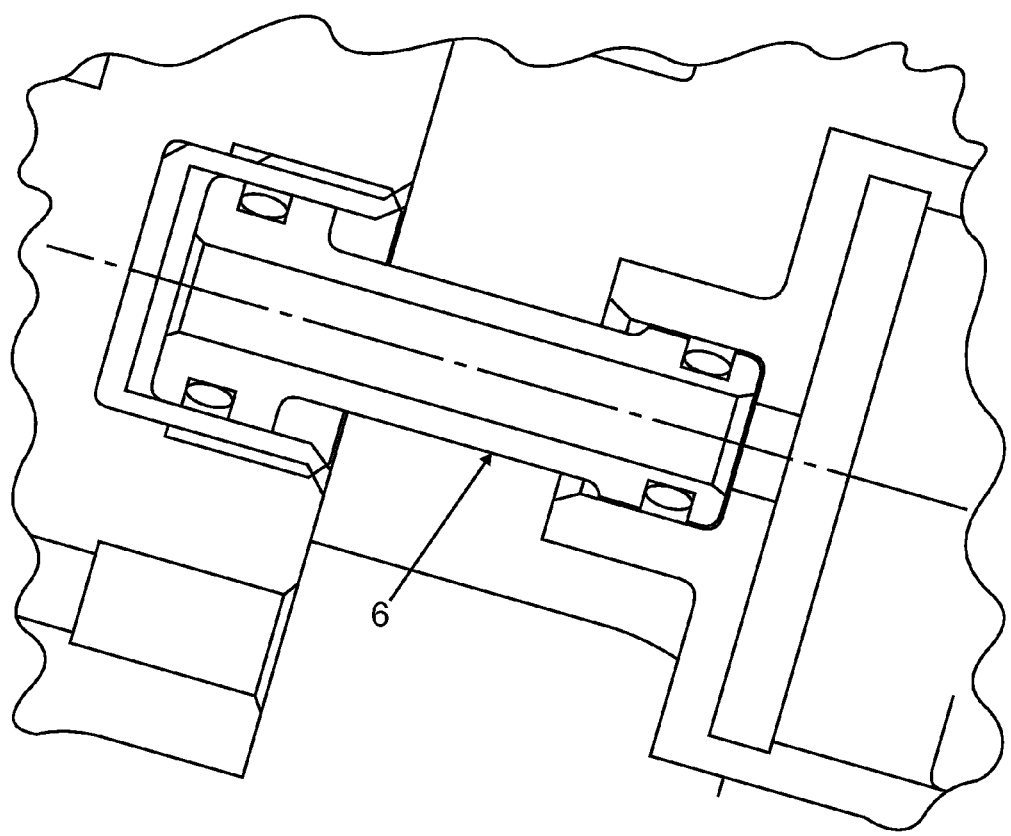
FIG. 4 is a cross-sectional view of a prior art low pressure internal transfer tube with cylindrical ends, shown without cross-hatching for simplicity.
Figure 5:
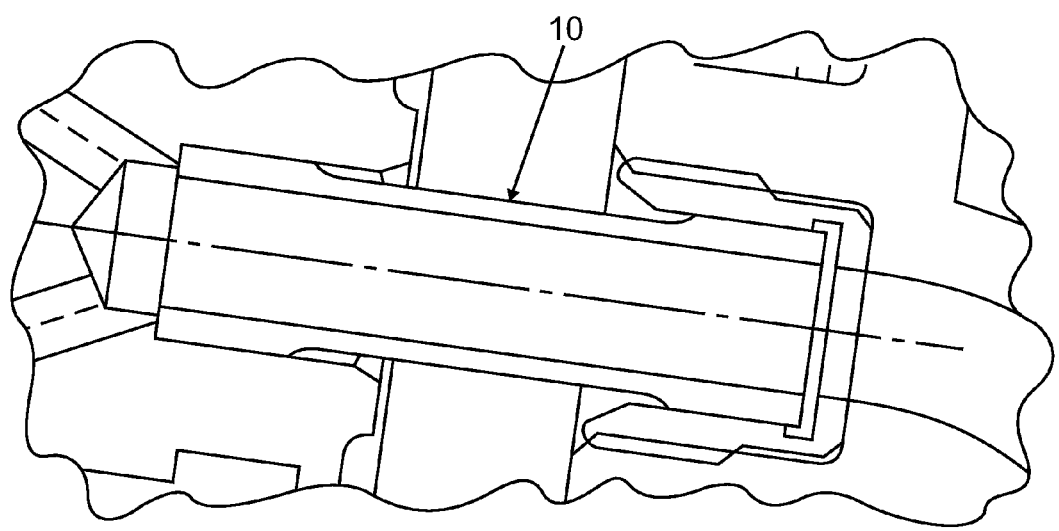
FIG. 5 is a cross-sectional view of a prior art low pressure internal transfer tube with crowned ends, shown without cross-hatching for simplicity.
Figure 6:
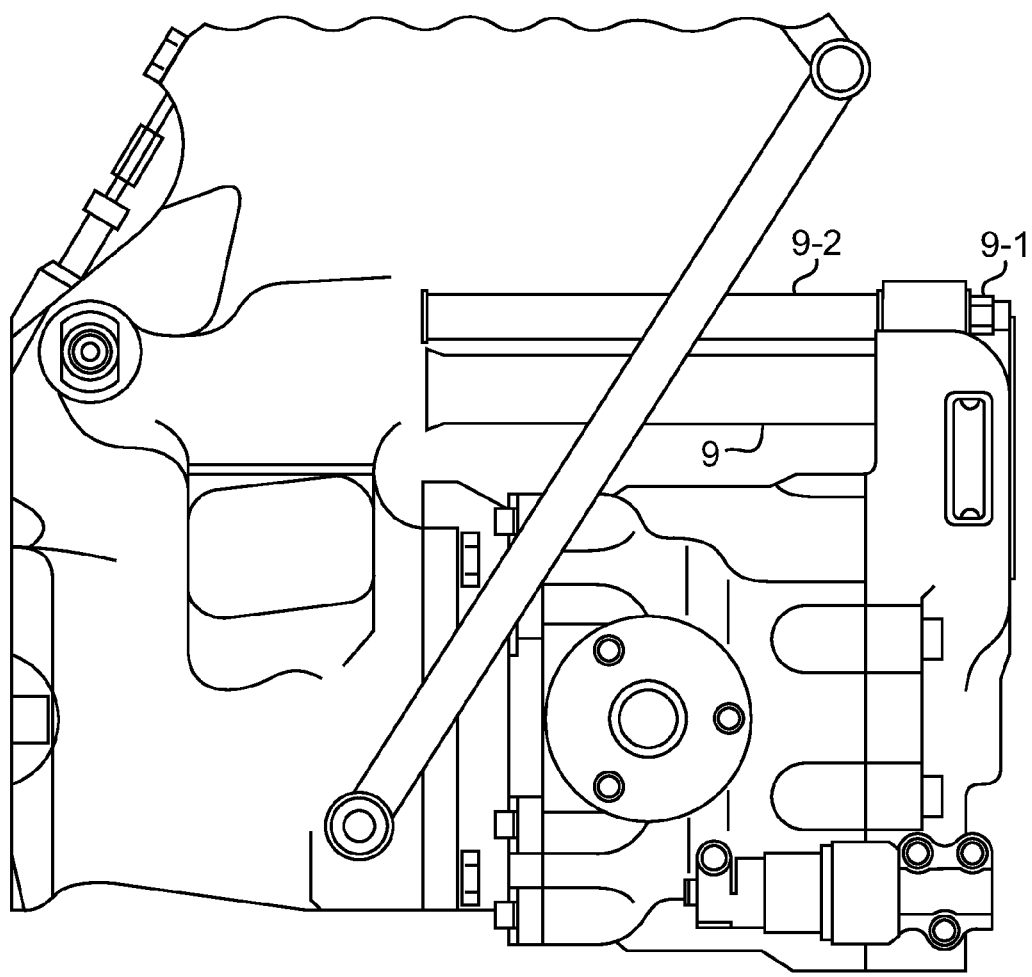
FIG. 6 is a side view of a prior art RAT assembly using transfer tube with cylindrical ends.

FIG. 2 is a perspective view of a portion of the RAT 10, and FIG. 3 is a cross-sectional view of the transfer tube assembly, taken along line 3-3 of FIG. 2. As shown in FIGS. 2 and 3, the generator housing 34 includes a cylindrical portion 34-1 that is located near the hydraulic pump 20. A first socket (or port) 34-2, a second socket (or port) 34-3, and an attachment post 34-4 are provided in the cylindrical portion 34-1. It should be noted that the hydraulic pump 20 generally includes a hydraulic pump cover or other housing, which is the part of the pump 20 visible in the figures. Internal workings of the pump 20 do not directly bear on the present invention, and so are not explained further here.

The pivot post 24 extends through the cylindrical portion 34-1, such that at least a portion of the pivot post 24 is positioned within the cylindrical portion 34-1 of the generator housing 34. The pivot post 24 is rotationally pivotable relative to the generator housing 34 about an axis A defined along the pivot post 24. A fluid inlet port 24-1 and a relatively high pressure fluid outlet port 24-2 are further provided on the pivot post 24. The high pressure fluid outlet portion 24-2 can be connected to the fluid delivery location 30, and the fluid inlet port 24-1 can be connected to the fluid supply location 28. The pivot post 24 and the cylindrical portion 34-1 of the generator housing 34 provide a pivotal mechanical support for the RAT 10, allowing pivotal deployment and retraction relative to the airframe 12.

The pivot post 24 and the cylindrical portion 34-1 of the generator housing 34 further provide a plurality of sealed flow paths that traverse the pivot axis A. In other words, flow paths are provided that allow fluid conduits and flow paths to remain sealed while still allowing movement of the RAT 10 for deployment and stowage. A high pressure fluid path is formed between the first socket 34-2 of the generator housing 34 and the high pressure fluid outlet port 24-2 of the pivot post 24. Another, separate, relatively lower pressure fluid path is formed between the fluid inlet port 24-1 of the pivot post 24 and the second socket 34-3 of the generator housing 34.

The hydraulic pump 20 has a fluid inlet port 20-1, a high pressure fluid outlet port 20-2, and a flange 20-3 extending adjacent to the high pressure fluid outlet port 20-2. The fluid inlet port 20-1 can be connected to the second socket 34-3 of the generator housing 34 by a tube 36. Because fluid delivered to the hydraulic pump 20 has not yet been pressurized by the pump 20, it is at a relatively lower pressure and therefore the tube 36 and its associated mating connections are less prone to leakage. The tube 36 can be curved to facilitate alignment. The high pressure fluid outlet port 20-2 is arranged to face the first socket 34-2 on the cylindrical portion 34-1 of the generator housing 34. The hydraulic pump 20 can pressurize fluid (e.g., liquid hydraulic fluid), to significant pressures, such as 13,790 kPa+/−690 kPa (3000 psi+/−100 psi) or more. The pressurized fluid is output to the high pressure fluid outlet port 20-2.

A transfer tube 38 is positioned between the hydraulic pump 20 and the generator housing 34 to fluidically couple the high pressure fluid outlet port 20-2 and the first socket 34-2 and provide a sealed fluid transmission path therebetween. At least a portion of the transfer tube 38 is exposed to ambient air. The high pressure fluid outlet port 20-2 for the RAT 10 is located fairly close to the generator housing 34. Due to tight envelope requirements, there is not enough room to move the pump's fluid outlet port 20-2 further from the generator housing 34, so the transfer tube 38 must be fairly short in length. Normal part tolerances cause a significant difference in the true position of the high pressure fluid outlet port 20-2 of the hydraulic pump 20 from the first socket 34-2 of the generator housing 34, with potentially more misalignment than a typical prior art straight transfer tube can accommodate. Misalignment can arise from variations of part tolerances, as well as alignment variations in an assembly stack-up. High misalignment could cause undesirable part interference and fluid leakage to the exterior. However, the transfer tube 38 allows for sealed fluid transmission at relatively high pressures with a reduced risk of fluid leakage.

The transfer tube 38 can be configured as an elongate tube with a length L and seals 40. In one embodiment, the length L is approximately 4.8 cm (1.9 inches). The transfer tube 38 has a first end 38-1 and a second end 38-2, with a necked region 38-3 between the ends 38-1 and 38-2. A bore 38-4 is provided through the transfer tube 38, with a bore diameter that can be optimized to produce a minimum pressure drop. The first end 38-1 has a smaller outside diameter than the second end 38-2, to help reduce "shuttling" of the transfer tube 38 in operation, in response to fluid pressure pulses. One or both of the ends 38-1 and 38-2 can be crowned, such as with spherical crowning. Crowning can be selected by estimating the expected amount of misalignment and then providing enough crowning to prevent binding. As shown in FIG. 3, the ends 38-1 and 38-2 of the transfer tube 38 are crowned with a relatively large spherical crowning radius R (measured from a centerpoint C) that can be expressed as $R \approx 5*L$ or by other relationships to the length L or other dimensions of the transfer tube 38, in alternative embodiments. In one embodiment the crowning radius R is approximately 25 cm (10 inches) where the length L is approximately 4.8 cm (1.9 inches). In general, the larger the potential misalignment, the smaller the radius R should be. The crowning radius R creates a spherical surface that is swept about the ends 38-1 and 38-2 to create generally toroidal exterior surfaces.

The spherically crowned surfaces of the ends 38-1 and 38-2 allow the transfer tube 38 to cant or tilt relative to the generator housing 34 and the hydraulic pump 20, in essentially any direction in three dimensional space, to accommodate misalignment between the high pressure fluid outlet port 20-2 of the hydraulic pump 20 and first socket 34-2 of the generator housing 34. A small axial gap can be provided adjacent to one or both ends 38-1 and 38-2 of the transfer tube 38, which can facilitate canting of the tube 38.

Seals 40, such as elastomeric T-seal glands 40-1 each with two extrusion back up rings 40-2, are provided at each end 38-1 and 38-2 of the transfer tube 38 in the illustrated embodiment. The seals 40 can be positioned within corresponding circumferential grooves 42 formed in the transfer tube 38. In the illustrated embodiment, the seals 40 are positioned along the crowned surfaces of the ends 38-1 and 38-2. In one embodiment, the T-seal glands 40-1 can be G-T® ring seals (available from Greene Tweed, Kulpsville, Pa., USA) or an equivalent. A gland width can be selected per aerospace standards for a standard O-ring and two backup rings. Greater misalignment of the transfer tube 38 could be accommodated, in alternative embodiments, by using a narrower seal designed for a standard O-ring and a single backup ring gland. The center C of the spherical radius R can be substantially axially aligned with an axial center or midpoint of the corresponding seal gland 40-1, which allows for misalignment of the transfer tube 38 with reduced or minimal undesirable effect on seal squeeze. The T-seal glands 40-1 are shown merely by way of example and not limitation. In alternative embodiments, O-ring seals or other suitable seals can be used instead of T-seals.

When the RAT 10 is dormant, the transfer tube 38 is subjected to low pressure in the tube. However, when the RAT 10 is deployed and the hydraulic pump 20 is operational, the tube 38 will be subjected to high pressure. Typical hydraulic pumps produce pressure pulses from each piston stroke, so pressure balancing is required to keep the transfer tube 38 from moving back and forth axially, which unchecked could cause fretting seal failure. One end 38-2 is larger than the other end 38-1 to provide a positive load on the transfer tube 38 to help keep the tube 38 seated and stationary, which helps avoid seal wear and leakage.

A pressure reaction member 44 is engaged between respective connection structures of the hydraulic pump 20 and the generator housing 34, more specifically between the attachment post 34-4 on the cylindrical portion 34-1 of the generator housing 34 and the flange 20-3 of the hydraulic pump 20, in the illustrated embodiment. The pressure reaction member 44 helps externally balance fluid pressure within the transfer tube 38. The pressure reaction member 44 can be located as close as practical to the transfer tube 38 and arranged substantially parallel to the transfer tube 38, to react a majority of axial loading. The remainder of the axial loading can be reacted by the hydraulic pump 20. The pressure reaction member 44 helps keeps the hydraulic pump 20, particularly at or near the high pressure fluid outlet port 20-2 and the flange 20-3, from moving axially relative to the generator housing 34, so that the seals 40 of the transfer tube 38 do not have to slide. Pressure reaction member 44 also reduces the pressure load on the housing of the hydraulic pump 20 to help reduce stress. In the illustrated embodiment, the pressure reaction member 44 is a threaded bolt positioned immediately adjacent to the transfer tube 38 (i.e., within a space of a diameter of the transfer tube 38).

One or more shims 46 can be provided between the attachment post 34-4 on the cylindrical portion 34-1 of the generator housing 34 and the flange 20-3 of the hydraulic pump 20 to help reduce a risk of preload forces of the pressure reaction member 44 from bending the flange 20-3 of the hydraulic pump 20 or other structures. The shims 46 can be positioned at the pressure reaction member 44 to occupy or "back fill" a space between the attachment post 34-4 on the cylindrical portion 34-1 of the generator housing 34 and the flange 20-3 of the hydraulic pump 20. The shims 46 can have thicknesses selected as a function of actual spacing between the attachment post 34-4 and the flange 20-3, which will generally vary slightly for each RAT 10.

The RAT 10 can be assembled by engaging the crowned transfer tube 38 between the high pressure fluid outlet port 20-2 of the hydraulic pump 20 and the high pressure fluid port socket 34-2 of the generator housing 34. The crowned transfer tube 38 can be canted, in three dimensional space, to accommodate misalignment between the high pressure fluid outlet port 20-2 of the hydraulic pump 20 and the high pressure fluid port socket 34-2 of the generator housing 34. With the transfer tube 38 in place, the pressure reaction member 44 can be engaged between the attachment post 34-4 on the cylindrical portion 34-1 of the generator housing 34 and the flange 20-3 of the hydraulic pump 20 at a location proximate the transfer tube 38 to react loading in a direction generally parallel to the crowned transfer tube 38. At least one shim 46 can be positioned between the hydraulic pump 20 and the generator housing 34 such that the shim(s) 46 are engaged with the pressure reaction member 44.

Those of ordinary skill in the art will recognize that the present invention provides numerous advantages and benefits. For example, without crowning, metal-to-metal interference between the transfer tube 38 and the hydraulic pump 20 and/or generator housing 34 is expected, and the seal squeeze is expected to be too high on one side of the seal 40, and too low on the other. Crowning allows for reliable sealing and fluid transfer between points subject to relatively high degrees of misalignment, with a relatively low risk of fluid leakage.

Any relative terms or terms of degree used herein, such as "substantially", "essentially", "generally" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

Discussion of Possible Embodiments

The following are non-exclusive descriptions of possible embodiments of the present invention.

A hydraulic system for a ram air turbine includes a hydraulic pump having a high pressure fluid outlet port; a housing; a pivot post arranged to pass through the housing and defining a mechanical pivot relative to the housing about an axis, wherein a fluid inlet path and a high pressure fluid outlet path pass through the housing and the pivot post; a transfer tube positioned between the high pressure fluid outlet port of the hydraulic pump and a port in the housing for the high pressure fluid outlet path, wherein the transfer tube has a crowned end; and seal elements positioned at or near opposite ends of the transfer tube.

The system of the preceding paragraph can optionally include, additionally and/or alternatively, any one or more of the following features, configurations and/or additional components:

a pressure reaction member engaged between the housing and the hydraulic pump adjacent to the transfer tube;

the pressure reaction member can extend substantially parallel to the transfer tube;

at least one shim positioned at the pressure reaction member to occupy a space between respective connection structures of the housing and the hydraulic pump;

at least one of the seal elements can comprise a T-seal or O-ring;

backup rings abutting each T-seal;

opposite ends of the transfer tube can both be spherically crowned;

the seal elements can be positioned along crowned surfaces of the crowned ends;

the opposite ends of the transfer tube can have different diameters;

the transfer tube can have an overall length L and the crowned end can have a crowning radius R, where $R \approx 5*L$;

L can be approximately 4.8 cm (1.9 inches) and R can be approximately 25 cm (10 inches);

the high pressure fluid outlet port can provide hydraulic fluid pressurized to at least approximately 13,790 kPa (3000 psi); and/or at least a portion of the transfer tube can be exposed to ambient air during deployment.

A ram air turbine assembly includes a rotatable turbine; a hydraulic pump having a high pressure fluid outlet port, wherein the hydraulic pump is configured to be powered by the turbine; a housing; a pivot post arranged to pass through the housing and defining a mechanical pivot relative to the housing about an axis, wherein a fluid inlet path and a high pressure fluid outlet path pass through the housing and the pivot post; a transfer tube positioned between the high pressure fluid outlet port of the hydraulic pump and a port in the housing for the high pressure fluid outlet path, wherein the transfer tube has spherically crowned ends; and a pressure reaction member engaged between the housing and the hydraulic pump positioned adjacent and substantially parallel to the transfer tube.

The assembly of the preceding paragraph can optionally include, additionally and/or alternatively, any one or more of the following features, configurations and/or additional components:

at least one shim positioned at the pressure reaction member to occupy a space between respective connection structures of the housing and the hydraulic pump;

seal elements positioned along crowned surfaces of the crowned ends, wherein at least one of the seal elements comprises a T-seal; and backup rings abutting each T-seal;

the transfer tube can have an overall length L and the crowned end can have a crowning radius R, where R≈5*L; and/or the high pressure fluid outlet port can provide hydraulic fluid pressurized to at least approximately 13,790 kPa (3000 psi), and at least a portion of the transfer tube can be exposed to ambient air during deployment.

A method making a fluid conduit for a ram air turbine includes providing a hydraulic pump having a high pressure fluid outlet; providing a housing having a high pressure fluid port; engaging a crowned transfer tube between the high pressure fluid outlet of the hydraulic pump and the high pressure fluid port of the housing; canting the crowned transfer tube to accommodate misalignment between the high pressure fluid outlet of the hydraulic pump and the high pressure fluid port of the housing; and engaging a pressure reaction member between the housing and the hydraulic pump proximate the transfer tube to react loading in a direction generally parallel to the crowned transfer tube.

The method of the preceding paragraph can optionally include, additionally and/or alternatively, any one or more of the following features and/or additional steps:

positioning at least one shim between the hydraulic pump and the housing such that the shim is engaged with the pressure reaction member.

The invention claimed is:

1. A hydraulic system for a ram air turbine, the system comprising:
    a hydraulic pump having a high pressure fluid outlet port;
    a housing;
    a pivot post arranged to pass through the housing and defining a mechanical pivot relative to the housing about an axis, wherein a fluid inlet path and a high pressure fluid outlet path pass through the housing and the pivot post;
    a transfer tube positioned between the high pressure fluid outlet port of the hydraulic pump and a port in the housing for the high pressure fluid outlet path, wherein the transfer tube has a crowned end, wherein at least a portion of the transfer tube is exposed to ambient air during deployment; and
    seal elements positioned at or near opposite ends of the transfer tube.

2. The system of claim 1 and further comprising:
    a pressure reaction member engaged between the housing and the hydraulic pump adjacent to the transfer tube.

3. The system of claim 2, wherein the pressure reaction member extends substantially parallel to the transfer tube.

4. The system of claim 2 and further comprising:
    at least one shim positioned at the pressure reaction member to occupy a space between respective connection structures of the housing and the hydraulic pump.

5. The system of claim 1, wherein at least one of the seal elements comprises a T-seal.

6. The system of claim 5 and further comprising:
    backup rings abutting each T-seal.

7. The system of claim 1, wherein opposite ends of the transfer tube are both spherically crowned.

8. The system of claim 7, wherein the seal elements are positioned along crowned surfaces of the crowned ends.

9. The system of claim 1, wherein opposite ends of the transfer tube have different diameters.

10. The system of claim 1, wherein the transfer tube has an overall length L and wherein the crowned end has a crowning radius R, where R≈5*L.

11. The system of claim 10, wherein L is approximately 4.8 cm (1.9 inches) and R is approximately 25 cm (10 inches).

12. The system of claim 1, wherein the high pressure fluid outlet port is configured to provide hydraulic fluid pressurized to at least approximately 13,790 kPa (3000 psi).

13. A method of making a fluid conduit for a ram air turbine, the method comprising:
    providing a hydraulic pump having a high pressure fluid outlet;
    providing a housing having a high pressure fluid port;
    engaging a crowned transfer tube between the high pressure fluid outlet of the hydraulic pump and the high pressure fluid port of the housing;
    exposing at least a portion of the crowned transfer tube to ambient air during deployment;
    canting the crowned transfer tube to accommodate misalignment between the high pressure fluid outlet of the hydraulic pump and the high pressure fluid port of the housing; and
    engaging a pressure reaction member between the housing and the hydraulic pump proximate the transfer tube to react loading in a direction generally parallel to the crowned transfer tube.

14. The method of claim 13 and further comprising:
    positioning at least one shim between the hydraulic pump and the housing such that the shim is engaged with the pressure reaction member.

15. A ram air turbine assembly comprising:
    a rotatable turbine;
    a hydraulic pump having a high pressure fluid outlet port, wherein the hydraulic pump is configured to be powered by the turbine;
    a housing;
    a pivot post arranged to pass through the housing and defining a mechanical pivot relative to the housing about an axis, wherein a fluid inlet path and a high pressure fluid outlet path pass through the housing and the pivot post;
    a transfer tube positioned between the high pressure fluid outlet port of the hydraulic pump and a port in the housing for the high pressure fluid outlet path, wherein the transfer tube has spherically crowned ends, wherein at least a portion of the transfer tube is exposed to ambient air during deployment; and a pressure reaction member engaged between the housing and the hydraulic pump positioned adjacent and substantially parallel to the transfer tube.

16. The assembly of claim 15 and further comprising:

at least one shim positioned at the pressure reaction member to occupy a space between respective connection structures of the housing and the hydraulic pump.

17. The assembly of claim 15 and further comprising:

seal elements positioned along crowned surfaces of the crowned ends, wherein at least one of the seal elements comprises a T-seal; and backup rings abutting each T-seal.

18. The assembly of claim 15, wherein the transfer tube has an overall length L and wherein the crowned end has a crowning radius R, where R≈5*L.

19. The assembly of claim 15, wherein the high pressure fluid outlet port is configured to provide hydraulic fluid pressurized to at least approximately 13,790 kPa (3000 psi).

\* \* \* \* \*